US007626063B2

(12) United States Patent
Ghonasgi et al.

(10) Patent No.: US 7,626,063 B2
(45) Date of Patent: Dec. 1, 2009

(54) PROPANE UTILIZATION IN DIRECT HYDROTREATING OF OILS AND/OR FATS

(75) Inventors: Dhananjay B. Ghonasgi, Bartlesville, OK (US); Edward L. Sughrue, II, Bartlesville, OK (US); Jianhua Yao, Bartlesville, OK (US); Xiaochun Xu, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 11/747,380

(22) Filed: May 11, 2007

(65) Prior Publication Data

US 2008/0281134 A1    Nov. 13, 2008

(51) Int. Cl.
*C07C 5/02* (2006.01)
(52) U.S. Cl. ................. 585/276; 585/275; 585/733
(58) Field of Classification Search .......... 585/276, 585/275, 733
See application file for complete search history.

(56) References Cited

U.S. PATENT DOCUMENTS

| | | | | |
|---|---|---|---|---|
| 2,163,563 A * | 6/1939 | Schrauth | ................ | 208/112 |
| 3,119,667 A * | 1/1964 | McMahon | ................ | 423/654 |
| 3,617,227 A * | 11/1971 | Beggs | ................ | 422/204 |
| 3,771,261 A * | 11/1973 | Mandelik et al. | ................ | 48/214 A |
| 3,956,105 A * | 5/1976 | Conway | ................ | 208/111.3 |
| 4,188,284 A * | 2/1980 | Quick et al. | ................ | 208/216 PP |
| 4,191,635 A * | 3/1980 | Quick et al. | ................ | 208/89 |
| 4,233,187 A * | 11/1980 | Atwood et al. | ................ | 502/335 |
| 4,300,009 A | 11/1981 | Haag et al. | | |
| 4,328,128 A | 5/1982 | Stanulonis et al. | | |
| 4,337,178 A * | 6/1982 | Atwood et al. | ................ | 502/328 |
| 4,374,020 A * | 2/1983 | Trevino et al. | ................ | 208/216 R |
| 4,400,263 A | 8/1983 | Kydd et al. | | |
| 4,411,777 A * | 10/1983 | McKay | ................ | 208/120.15 |
| 4,420,388 A | 12/1983 | Bertolacini et al. | | |
| 4,472,266 A | 9/1984 | Oleck et al. | | |
| RE32,044 E * | 12/1985 | Atwood et al. | ................ | 502/335 |
| 4,640,765 A * | 2/1987 | Kubo | ................ | 208/110 |
| 4,764,265 A | 8/1988 | Bijwaard et al. | | |
| 4,822,935 A | 4/1989 | Scott | | |
| 4,857,168 A * | 8/1989 | Kubo et al. | ................ | 208/58 |
| 4,966,679 A * | 10/1990 | Kubo et al. | ................ | 208/58 |
| 4,992,605 A * | 2/1991 | Craig et al. | ................ | 585/240 |
| 4,995,605 A * | 2/1991 | Conville | ................ | 52/770 |
| 5,026,536 A * | 6/1991 | Shioiri et al. | ................ | 423/652 |
| 5,358,696 A * | 10/1994 | Jahnke | ................ | 423/650 |
| 5,395,511 A * | 3/1995 | Kubo et al. | ................ | 208/111.3 |
| 5,705,722 A * | 1/1998 | Monnier et al. | ................ | 585/240 |
| 6,224,748 B1 * | 5/2001 | Chang et al. | ................ | 208/112 |
| 6,235,955 B1 | 5/2001 | Yao et al. | | |
| 6,249,170 B1 | 6/2001 | Main et al. | | |
| 6,270,655 B1 * | 8/2001 | Ganguli | ................ | 208/85 |
| 6,296,679 B1 * | 10/2001 | Kato | ................ | 48/197 R |
| 6,375,906 B1 * | 4/2002 | Edlund et al. | ................ | 422/189 |
| 6,511,520 B1 * | 1/2003 | Eber et al. | ................ | 44/388 |
| 6,592,639 B2 * | 7/2003 | Bernasconi et al. | ........... | 44/388 |
| 6,616,909 B1 * | 9/2003 | Tonkovich et al. | ........ | 423/648.1 |
| 6,784,332 B1 * | 8/2004 | Kimble et al. | ................ | 585/407 |
| 6,872,364 B2 * | 3/2005 | Bierl et al. | ................ | 422/139 |
| 7,005,113 B2 * | 2/2006 | Edlund et al. | ................ | 422/189 |
| 7,041,271 B2 | 5/2006 | Drnevich et al. | | |
| 7,250,151 B2 * | 7/2007 | Tonkovich et al. | .......... | 423/659 |
| 7,279,018 B2 * | 10/2007 | Jakkula et al. | ................ | 44/301 |
| 7,285,350 B2 * | 10/2007 | Keefer et al. | ................ | 429/34 |
| 7,291,257 B2 * | 11/2007 | Ackerson et al. | ............ | 208/213 |
| 2003/0072699 A1 * | 4/2003 | Tonkovich et al. | .......... | 422/190 |
| 2003/0138373 A1 * | 7/2003 | Graham et al. | ................ | 423/650 |
| 2004/0055209 A1 | 3/2004 | Jakkula et al. | | |
| 2004/0131912 A1 * | 7/2004 | Keefer et al. | ................ | 429/34 |
| 2004/0175327 A1 * | 9/2004 | Hagemeyer et al. | ......... | 423/656 |
| 2004/0230085 A1 | 11/2004 | Jakkula et al. | | |
| 2007/0260102 A1 * | 11/2007 | Santiago et al. | ............ | 585/733 |

FOREIGN PATENT DOCUMENTS

| | | |
|---|---|---|
| EP | 1224970 A1 | 7/2002 |
| EP | 1396531 A2 | 3/2004 |
| FR | 2364877 A * | 5/1978 |

OTHER PUBLICATIONS

Tetralin. Wikipedia 2008. 1page.*
Mark Stumborg, Al Wong, and Ed Hogan; Hydroprocessed Vegetable Oils for Diesel Fuel Improvement, Bioresource Technology 56, 1996, 13-18, Elsevier Science Limited, Great Britain.
Wolfgang Baldauf and Martin Rupp; Processing of Rape Oil in Mineral Oil Refineries, Biomass Energy, Ind. Environ., E.C. Conf, 1992, 831-835, VEBA OEL AG, Gelsenkirchen, Germany.
W. Baldauf, U. Balfanz, and T. Hohmann; Biomass Derived Transportation Fuel in Petroleum Refineries, Biomass Energy, Ind. Environ., Agriculture and Industry Conf., 1995, 1129-1139, VEBA OEL AG, Gelsenkirchen, Germany.

* cited by examiner

*Primary Examiner*—Elvis O Price

(57) ABSTRACT

Methods for producing C10-C30 hydrocarbons from fatty compounds are provided in which at least a portion of the hydrogen required to accomplish the conversion is generated from by-products of the conversion process. Light hydrocarbons, especially propane, produced during the conversion of triglyceride compounds are used to generate hydrogen which is used in the conversion process thereby reducing the need for outside hydrogen sources.

28 Claims, 1 Drawing Sheet

PROPANE UTILIZATION IN DIRECT HYDROTREATING OF OILS AND/OR FATS

BACKGROUND OF THE INVENTION

1. Field of the Invention

The present invention relates generally to a hydrotreating process for converting fatty materials such as triglycerides, diglycerides, monoglycerides, and free fatty acids into hydrocarbon compounds, especially diesel fuel range hydrocarbons and propane. The propane and any other light hydrocarbons produced during the hydrotreating process are used to generate hydrogen that is recycled to the hydrotreating process thereby reducing the demand for outside hydrogen sources.

2. Description of the Prior Art

As the demand for hydrocarbon fuels increases, the incentives for developing renewable hydrocarbon sources increase as well. Various economic, environmental and political pressures are driving the development of alternative energy sources that are compatible with existing technologies and infrastructure. The development of renewable hydrocarbon fuel sources, such as plant and animal sources, has been proposed as a solution to this problem.

"Bio-Diesel" is one such product that may be produced by subjecting a base vegetable oil to a transesterification process using methanol to convert the base oil to desired methyl esters. After processing, the products have very similar combustion properties as compared to petroleum-derived hydrocarbons. However, Bio-Diesel exhibits a number of down sides, especially its poor oxidative stability, propensity to gel in cold climates, and its cost.

Unmodified vegetable oils and fats have also been used as additives in diesel fuel to lower cost and improve the lubricity of the fuel. However, problems such as injector coking and the degradation of combustion chamber conditions have been associated with these unmodified additives. Processes for converting vegetable oil into hydrocarbons have been developed. However, these processes have often involved harsh reaction conditions, or the products from the reaction exhibit undesirable properties (such as high pour and cloud points) which render them unsuitable for use in diesel fuel. Further, these processes require significant quantities of hydrogen which increases the overall cost of producing the fuel.

Therefore, a need exists for a process for converting vegetable oils and fats into hydrocarbon compounds in the diesel fuel boiling range, especially C15-C18 hydrocarbons, that requires a minimal amount of outside hydrogen. Thus, it would be advantageous if the process could internally generate a large portion, if not a majority, of the hydrogen needed to carry out the conversion of the oils and fats to hydrocarbon compounds.

SUMMARY OF THE INVENTION

Accordingly, in one embodiment, the present invention provides a process comprising: (a) contacting a fluid comprising at least one fatty material selected from the group consisting of triglycerides, diglycerides, monoglycerides, and free fatty acids, and hydrogen with a catalyst in a reaction vessel under conditions sufficient for converting at least a portion of the at least one fatty material into one or more C10-C30 hydrocarbons and one or more C1-C6 hydrocarbons; (b) separating at least a portion of the one or more C1-C6 hydrocarbons from the one or more C10-C30 hydrocarbons; (c) generating hydrogen from the separated portion of C1-C6 hydrocarbons; and (d) feeding the generated hydrogen to the reaction vessel of step (a).

In another embodiment, the present invention provides a process comprising: (a) contacting a fluid comprising at least one fatty material selected from the group consisting of triglycerides, diglycerides, monoglycerides, and free fatty acids, and hydrogen with a hydrotreating catalyst in a reaction vessel under conditions sufficient for converting at least a portion of the at least one fatty material into one or more C10-C30 hydrocarbons and propane; (b) separating at least a portion of the propane from the C10-C30 hydrocarbons; (c) steam reforming the separated portion of propane thereby generating hydrogen; and (d) feeding the generated hydrogen to the reaction vessel of step (a).

DETAILED DESCRIPTION OF THE PREFERRED EMBODIMENT

Figure 1:
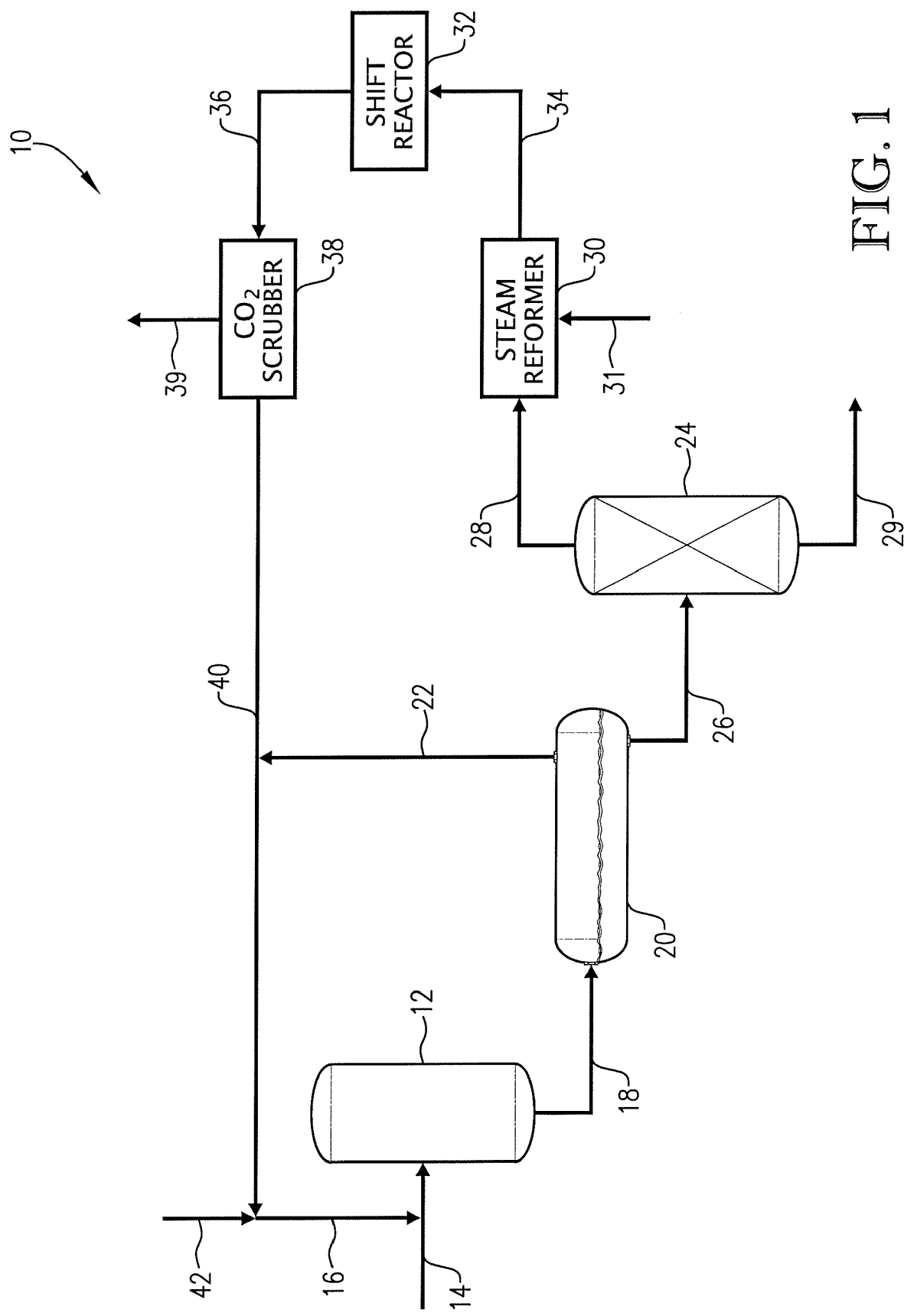
FIG. 1 depicts a process for the generation of hydrogen from the products of the conversion of fatty materials into hydrocarbon compounds.

In one embodiment of the present invention, a hydrotreating process is provided for converting fatty materials, such as triglyceride compounds, into C10-C30 hydrocarbon compounds, especially diesel boiling range hydrocarbons. The process also generates a quantity of lighter hydrocarbons, such as C1-C6 hydrocarbons, and particularly propane, that can be used to generate hydrogen that is recycled to the hydrotreating process. Thus, the demand for outside hydrogen is reduced. In certain embodiments, the generated hydrogen fulfills at least about 50% of the total hydrogen requirement for the hydrotreating process, and in other embodiments, the generated hydrogen fulfills at least about 65% of the total hydrogen requirement. In still other embodiments, the generated hydrogen fulfills at least about 75% of the total hydrogen requirement for the hydrotreating process.

Referring to FIG. 1, a hydrotreating process 10 is provided that comprises a hydrotreater 12 into which is supplied a liquid feed 14 and hydrogen 16. The liquid feed comprises at least one fatty material. As used herein, the term "fatty material" refers to a product that comprises, consists of, or consists essentially of a fatty acid or residue thereof. In certain embodiments, the fatty material is selected from the group consisting of triglycerides, diglycerides, monoglycerides, and free fatty acids. The term "triglyceride" generally refers to a naturally occurring ester of a fatty acid and/or glycerol having the general formula $CH_2(OCOR_1)$—$CH(OCOR_2)$—$CH_2(OCOR_3)$, where $R_1$, $R_2$, and $R_3$ are the same or different and may vary in chain length. Di- and monoglycerides comprise one or two fewer ester moieties, respectively. In certain embodiments, the fatty material, especially the triglyceride compound, is selected from the group consisting of vegetable oil, yellow grease (such as used restaurant oil or those derived from used cooking oils), animal fats, and mixtures thereof. Exemplary vegetable oils include, but are not limited to soybean oil, corn oil, peanut oil, sunflower seed oil, coconut oil, babassu oil, grape seed oil, poppy seed oil, almond oil, hazelnut oil, walnut oil, olive oil, avocado oil, sesame oil, tall oil, cottonseed oil, palm oil, rice bran oil, canola oil, cocoa butter, shea butter, butyrospermum, wheat germ oil, illipse butter, meadowfoam, seed oil, rapeseed oil, borange seed oil, linseed oil, caster oil, vernoia oil, tung oil, jojoba oil, ongokea oil. Exemplary animal fats include tallow animal fat, beef fat, chicken fat, pork fat, and milk fat.

The liquid feed may also include at least one hydrocarbon compound having a boiling point of between about 80° F. to about 1000° F. Exemplary hydrocarbon compounds include middle distillate fuels. Middle distillate fuels generally contain hydrocarbons that boil in the middle distillate boiling range of between about 300° F. to about 750° F. Typical middle distillate fuels include those selected from the group consisting of gasoline, naphtha, jet fuel, kerosene, diesel fuel, light cycle oil (LCO), vacuum gas oil, atmospheric gas oil, atmospheric tower bottoms, and combinations thereof. In one embodiment, the middle distillate fuel presents an API gravity (ASTM D287) of between about 20 to about 50. In addition, the middle distillate fuels present a minimum flash point (ASTM D93) of greater than about 80° F., and in other embodiments, greater than abut 90° F.

Hydrocarbon compounds present in the reaction feed may also contain a quantity of aromatics, olefins, and sulfur, as well as paraffins and naphthenes. The amount of aromatics in the hydrocarbon generally may be in an amount of between about 10 to about 90 weight % based on the total weight of the hydrocarbons. In one embodiment, aromatics are present in an amount of between about 20 to about 80 weight %. The amount of olefins in the hydrocarbon generally may be in an amount of less than about 10 weight % based on the total weight of the hydrocarbon. In one embodiment, the olefins are present in an amount of less than about 5 weight %, and in still another embodiment, olefins are present in an amount of less than about 2 weight %.

The amount of sulfur in the hydrocarbon can generally be greater than about 50 parts per million by weight (ppmw). In one embodiment, sulfur is present in an amount of between about 100 ppmw to about 50,000 ppmw, and in another embodiment, sulfur is present in an amount of between about 150 to about 4,000 ppmw. As used herein, the term "sulfur" denotes elemental sulfur, and also any sulfur compounds normally present in a hydrocarbon stream, such as diesel fuel. The catalysts used with the present invention may also serve to remove sulfur compounds present in the hydrocarbon portion of the reaction feed. Exemplary sulfur compounds which may be removed include, but are not limited to, hydrogen sulfide, carbonyl sulfide (COS), carbon disulfide, mercaptans (RSH), organic sulfides (R—S—R), organic disulfides R—S—S—R), thiophene, substituted thiophenes, organic trisulfides, organic tetrasulfides, benzothiophene, alkyl thiophenes, dibenzothiophene, alkyl benzothiophenes, alkyl dibenzothiophenes, and mixtures thereof, as well as heavier molecular weights of the same, wherein each R can be an alkyl, cycloalkyl, or aryl group containing about 1 to about 10 carbon atoms.

The liquid feed generally comprises between about 0.1 to about 99.9 weight % fatty material, based on the total weight of the feed. In other embodiments, the feed comprises between about 2 to about 80 weight % fatty material, and in still other embodiments, the feed comprises between about 5 to about 30 weight % fatty material. If present, the hydrocarbon compound generally comprises between about 0.1 to about 99.9 weight % of the feed. In other embodiments, the feed comprises between about 10 to about 98 weight % of the hydrocarbon compound, and in still other embodiments, the feed comprises between about 50 to about 95 weight % of the hydrocarbon compound. In certain embodiments, the weight ratio of fatty material to hydrocarbon in the reaction feed is between about 1:1000 to about 1000:1. In other embodiments, the weight ratio of fatty material to hydrocarbon in the reaction feed is between about 1:50 to about 50:1. In still other embodiments, the weight ratio of fatty material to hydrocarbon in the reaction feed is between about 1:25 to about 25:1.

Hydrogen stream 16 generally comprises at least about 25 volume % hydrogen based on the total volume of the stream. In certain embodiments, hydrogen stream 16 comprises more than about 50 volume % hydrogen, and in other embodiments, more than about 75 volume % hydrogen. Hydrogen stream 16 may also comprise various inert components such as nitrogen, helium, argon, or carbon dioxide.

The rate at which hydrogen stream 16 is charged to hydrotreater 12 is generally in the range of from about 300 standard cubic feet per barrel (SCFB) of reactants to about 10,000 SCFB. In one embodiment, hydrogen stream 16 is charged to hydrotreater 12 in the range of about 1,200 SCFB to about 8,000 SCFB. In another embodiment, hydrogen stream 16 is charged to hydrotreater 12 in the range of about 2,500 SCFB to about 6,000 SCFB. In still another embodiment, hydrogen stream 16 is charged to hydrotreater 12 in the range of about 3,000 to about 5,000 SCFB. As depicted in the FIG. 1, liquid feed 14 and hydrogen stream 16 are combined prior to introduction into hydrotreater 12, and are thereafter co-fed into the hydrotreater. Of course, it is within the scope of the invention for the liquid feed 14 and hydrogen stream 16 to be independently fed into hydrotreater 12 through separate inlet ports.

As used herein, the term "liquid hourly space velocity" or "LHSV" refers to the numerical ratio of the rate at which the reactants are charged to the reaction zone in barrels per hour at standard conditions of temperature and pressure (STP) divided by the barrels of catalyst contained in the reaction zone to which the reactants are charged. In certain embodiments, the LHSV is between about $0.5\,\mathrm{hr}^{-1}$ to about $5\,\mathrm{hr}^{-1}$. In other embodiments, the LHSV is between about $1.0\,\mathrm{hr}^{-1}$ to about $5\,\mathrm{hr}^{-1}$. In still other embodiments, the LHSV is between about $1.8\,\mathrm{hr}^{-1}$ to about $3.0\,\mathrm{hr}^{-1}$.

A hydrotreating catalyst is contained within hydrotreater 12 and facilitates the conversion of the fatty material and hydrogen into hydrocarbon compounds. Generally, the hydrotreating catalyst can be any catalyst known in the art to be suitable for hydrotreating operations, especially those catalysts which comprise a Group VIII metal and a Group VIB metal (of the CAS periodic table), and oxides and sulfides thereof on a porous support. Exemplary hydrotreating catalysts include alumina supported cobalt-molybdenum, nickel sulfide, nickel-tungsten, cobalt-tungsten and nickel-molybdenum. In certain embodiments, the hydrotreating catalyst comprises cobalt and molybdenum on an alumina support. In other embodiments, the catalyst comprises cobalt and molybdenum on a zeolite support, particularly ZSM-5.

The metal of the catalyst is usually distributed over the surface of a support in a manner that maximizes the surface area of the metal. Examples of suitable support materials for the hydrotreating catalysts include silica, silica-alumina, aluminum oxide, silica-magnesia, silica-titania, and acidic zeolites of natural or synthetic origin.

In still other embodiments, the catalyst comprises a modified cobalt/molybdenum on zeolite catalyst. In this embodiment, the process of forming the modified catalyst begins with one or more treatment steps on the zeolite support. The zeolite support, prior to depositing of the cobalt and molybdenum thereon, undergoes an acid leaching step and/or a steam treatment step. In the acid leaching step, the zeolite, which comprises at least some alumina as a binder, is contacted with an acid for a sufficient period of time to remove (or leach out) at least a portion of the alumina present therein. In one embodiment, the acid used is hydrochloric acid, however any strong acid capable of leaching out the alumina may be used. In one embodiment, the zeolite support is contacted with the acid at a temperature of between about 70° C. to about 100° C. for between about 1 to about 3 hours. Thus, the acid leaching step removes significant amounts of alumina from the zeolite so that the end catalyst comprises very little, or substantially no alumina. The catalyst formed using the modified zeolite support comprises less than about 10 weight % alumina. In one embodiment, the modified zeolite catalyst comprises less than about 5 weight % alumina; and in yet another embodiment, the modified zeolite catalyst comprises less than about 1 weight % alumina.

After the leaching process, the acid is removed from the support and washed, such as with distilled water, to remove any acid residues. The zeolite support may then undergo a steam treatment process during which it is contacted with steam at a temperature of between about 400° C. to about 750° C. In one embodiment, the support is contacted with steam at a temperature of between about 500° C. to about 700° C. The steam treatment step may last for at least about 2 hours, and in one embodiment, for between about 2 to about 6 hours. The cobalt and molybdenum is then loaded onto the zeolite support. The zeolite support is contacted with cobalt and molybdenum compounds in solution. In one embodiment, the solutions comprise ammonium molybdate and cobalt nitrate. The catalyst is then dried and calcined. In one embodiment, calcining occurs at a temperature of between about 400° C. to about 600° C., and in another embodiment at a temperature of between about 425° C. to about 500° C. The calcining may last for up to about 8 hours, however, in one embodiment, the calcining step lasts for between about 3-7 hours.

Hydrotreater 12 may comprise any suitable type of reactor. Exemplary reactors include fixed bed reactors and fluidized bed reactors. As used herein, the term "fluidized bed reactor" denotes a reactor wherein a fluid feed can be contacted with solid particles in a manner such that the solid particles are at least partly suspended within the reaction zone by the flow of the fluid feed through the reaction zone and the solid particles are substantially free to move about within the reaction zone as driven by the flow of the fluid feed through the reaction zone.

Generally, the temperature within hydrotreater 12 is maintained between about 500° F. to about 800° F., and in certain embodiments, between about 600° F. to about 800° F. The pressure within hydrotreater 12 is generally less than about 2000 psig, and more particularly between about 100 psig to about 750 psig. In one embodiment employing a fixed bed reactor, the pressure is maintained between about 100 psig to about 350 psig. In one embodiment employing a fluidized bed reactor, the pressure is maintained between about 400 psig to about 750 psig.

Reaction product stream 18 generally comprises gas and liquid fractions containing hydrocarbon products, which include, but are not limited to, diesel boiling range hydrocarbons. Reaction product stream 18 comprises both long chain carbon compounds having 13-20 or more carbon atoms per molecule, especially those selected from the group consisting of C15-C18 hydrocarbons and combinations thereof, and short chain carbon compounds having between 1-6 carbon atoms per molecule, especially those selected from the group consisting of methane, ethane, propane and butane. Of the short chain carbon compounds, the reaction product generally contains a greater amount of propane than any other C1-C6 compounds.

The reaction product also comprises between about 0.1 to about 50 weight % propane. In one particular embodiment, the reaction product comprises between about 0.25 to about 15 weight % propane, and in yet another embodiment, the reaction product comprises between about 0.5 to about 10 weight % of propane. In addition, the reaction product can further comprise by-products of carbon monoxide and carbon dioxide.

Generally, the hydrocarbon products of the hydrotreating process have a sulfur content that is substantially less than the sulfur content present in the reaction feed. The sulfur content of the product is at least 25% less than the sulfur content present in the reaction feed. In another embodiment, the sulfur content of the product is at least 50% less than the sulfur content present in the reaction feed. In still another embodiment, the sulfur content of the product is at least 75% less than the sulfur content present in the reaction feed.

The cetane number of the hydrocarbon product is determined using ASTM test method D 613.65. For example, the cetane number for a light cycle oil (LCO) feed stock is typically less than 28, and may in some instances be less than 26 or less than 24. Generally, the cetane number of the hydrocarbon product produced in accordance with the present invention will have a cetane number greater than that of the original feedstock.

When using certain hydrotreating catalysts, the hydrocarbon product of the hydrotreating process exhibits enhanced cold flow properties when compared to products produced using more conventional hydrotreating catalysts. In particular, processes employing catalysts comprising cobalt and molybdenum on a zeolite support (modified or unmodified) tend to yield products having enhanced cold flow properties. The pour point of the hydrocarbon product is determined using ASTM test method D 97. Generally, the pour point is the lowest temperature at which a petroleum product will begin to flow. The hydrocarbon product of a hydrotreating process employing a cobalt/molybdenum on zeolite catalyst presents a pour point of between about −30° F. to about 5° F. In one embodiment, the hydrocarbon product presents a pour point of between about −25° F. to about 0° F. In still another embodiment, the hydrocarbon product presents a pour point of between about −20° F. to about −10° F.

The cloud point of the hydrocarbon product is determined using ASTM test method D 2500. Generally, the cloud point is the temperature at which dissolved solids, such as wax crystals, begin to form in a petroleum product as it is cooled. The hydrocarbon product of a hydrotreating process employing the cobalt/molybdenum on zeolite present cloud points of less than about 10° F. In one embodiment, the hydrocarbon product presents a cloud point of between about −20° F. to about 10° F. In another embodiment, the hydrocarbon product presents a cloud point of between about −15° F. to about 5° F. In still another embodiment, the hydrocarbon product presents a cloud point of between about −12° F. to about 0° F.

Using the cobalt/molybdenum on zeolite may also result in an increased liquid yield without impairing the cold flow properties of the hydrocarbon product. The liquid yield (v/v) of a hydrotreating process employing the cobalt/molybdenum on zeolite catalysts is generally between about 0.60 to about 1.0. In one embodiment, the liquid yield is between about 0.75 to about 0.99, and in another embodiment, the liquid yield is between about 0.8 to about 0.98. In yet another embodiment, the liquid yield is between about 0.85 to about 0.95.

In another embodiment, hydrotreater 12 may comprise more than one type of hydrotreating catalyst. Particularly, the use of cobalt/molybdenum on zeolite catalysts described above in conjunction with other hydrotreating catalysts, such as cobalt/molybdenum on alumina, may also result in a hydrocarbon product having improved cold flow properties. The different catalysts may be disposed within a common reaction vessel, such as a fluidized or fixed bed reactor, or in separate vessels connected in series. The conditions within the reactor(s) and the reaction products may be the same as those described above.

It has been discovered that the order in which the fatty material-containing feed contacts the catalysts unexpectedly affects the cold flow properties and sulfur content of the reaction product, and the liquid yield of the process. In certain embodiments, the above properties can be improved by contacting the liquid feed first with the cobalt/molybdenum on zeolite catalyst, followed by a second, different hydrotreating catalyst. In one embodiment, the cobalt/molybdenum on zeolite and hydrotreating catalysts are contained within a common reactor and arranged as at least one layer of cobalt/molybdenum on zeolite catalyst followed by at least one layer of a different hydrotreating catalyst. The reactor may include a plurality of alternating layers of catalysts. In another embodiment, the cobalt/molybdenum on zeolite catalyst is contained within a first reactor and the different hydrotreating catalyst is contained within a second reactor. Further, this embodiment may include a plurality of alternating reactors of each catalyst.

As illustrated in Example 2 below, by contacting the reactor feed with the cobalt/molybdenum on zeolite catalyst and a different hydrotreating catalyst, the cold flow properties of the reaction product can be improved and the sulfur content of the reaction product decreased when compared to the reaction products of a hydrotreating process employing only one of the catalysts. Further, by contacting the reactor feed with the cobalt/molybdenum on zeolite catalyst and then subsequently with the other hydrotreating catalyst (as opposed to the other hydrotreating catalyst first followed by the cobalt/molybdenum on zeolite catalyst), the liquid yield of the reaction can also be improved. The liquid yield of a process employing alternating layers or reactors of catalysts may be the same as the hydrotreating process described above.

In the next step of process 10, hydrotreater product stream 18 is sent to a high-pressure separator 20. Separator 20 may comprise a tank or other type of flash vessel and functions to separate any unused hydrogen from hydrotreater 12 from the hydrocarbon products. In one embodiment, separator 20 operates at a pressure sufficient to flash the hydrogen contained within stream 18, keeping all other compounds in liquid form. Particularly, the pressure within separator 20 may be between about 250 psig to about 1000 psig. In other embodiments, the pressure within separator 20 may be between about 300 psig to about 750 psig. The hydrogen is removed through stream 22 and recycled to hydrotreater 12.

The liquids from separator 20 are delivered to a low-pressure separator 24 via stream 26. Separator 24 generally operates at a lower pressure than separator 20 as stream 26 comprises primarily hydrocarbon compounds. Separator 24 may operate under vacuum conditions up to pressures of about 500 psig. In certain embodiments, the pressure within separator 24 is from about ambient pressure to about 250 psig. Separator 24 may be another flash vessel, stripping column, stabilizer, or other separation means. Separator 24 operates to separate the light hydrocarbon portion of stream 26 from the heavier, long chain hydrocarbon portion. Particularly, the overhead stream 28 from separator 24 comprises primarily C1-C6 hydrocarbon compounds. In one embodiment, stream 28 comprises primarily propane. The bottoms from separator 24, shown as stream 29, comprise primarily C10-C30 hydrocarbon compounds, especially C15-C18 hydrocarbon compounds.

Stream 28 is directed to a steam reformer 30 for conversion of the light hydrocarbons (particularly propane) to hydrogen and carbon monoxide. Steam is supplied to steam reformer 30 via stream 31. Any standard steam reforming catalyst may be used within reformer 30. An exemplary steam reforming catalyst is nickel oxide on a low-silica refractory base. The conversion of propane to hydrogen within reformer 30 proceeds as follows:

$$C_3H_8 + 3H_2O \rightarrow 3CO + 7H_2$$

The gases exiting steam reformer 30 may then be directed to a water gas shift reactor 32 via stream 34. In reactor 32, the carbon monoxide is reacted with water to produce additional hydrogen. The conversion of carbon monoxide and water to hydrogen proceeds as follows:

$$CO + H_2O \rightarrow CO_2 + H_2$$

The gases exiting reactor 32 through stream 36 are passed through a carbon dioxide scrubber 38. Carbon dioxide is removed from scrubber 38 via stream 39. Hydrogen stream 40 is output from scrubber 38 and then combined with hydrogen stream 22 from high-pressure separator 20 and recycled to hydrotreater 12. Also, a hydrogen makeup stream 42 may be used to supply additional hydrogen necessary to meet the operational requirements of hydrotreater 12.

The overall hydrogen requirement for the operation of hydrotreater 12 depends upon the composition of the liquid feed, particularly the level and type of fatty materials present. For example, the fatty acid portions of vegetable oils tend to have more unsaturated bonds than the fatty acid portions of animal fats. Thus, the conversion of vegetable oils generally requires a greater input of hydrogen. However, the amount of C1-C6 hydrocarbons, primarily propane, produced by the hydrotreating operation is similar regardless of whether the fatty material is a vegetable oil, yellow grease, animal fat, and mixtures thereof.

Generally, hydrotreating one mole of vegetable oil consumes between about 12 to about 16 moles of hydrogen, and more particularly about 14 moles of hydrogen. However, hydrotreating one mole of animal fat, such as tallow, consumes between about 8 to about 10 moles of hydrogen, and more particularly about 10 moles of hydrogen. Further, while the cracking of hydrocarbons present in the liquid feed is preferably avoided, some degree of cracking may still occur in hydrotreater 12. Thus, some additional hydrogen may be consumed by the cracking of hydrocarbon compounds.

The relationship between the amount of hydrogen required and the composition of the liquid feed may be summarized as follows.

For vegetable oils:

$$\text{Total mols H}_2 \text{ required} = {}_{XT}*14 + (1_{-XT})*\text{mols H}_2 \text{ consumed by HC compounds,}$$

and for animal fats, namely tallow:

$$\text{Total mols H}_2 \text{ required} = {}_{XT}*10 + (1_{-XT})*\text{mols H}_2 \text{ consumed by HC compounds,}$$

wherein $X_T$ represents the fraction of the liquid feed that comprises the triglyceride compounds. Thus, if only animal fats are present in liquid feed 14, process 10 will be substantially hydrogen neutral with respect to the conversion of tri-, di-, and monoglycerides. A relatively minor amount of hydrogen may still need to be supplied to make up for the hydrogen consumed during saturation or cracking of the hydrocarbon compounds present in liquid feed 14.

EXAMPLE 1

In this example, four different hydrotreating catalysts were prepared and tested. The cold flow properties of the resulting, hydrotreated diesel fuel blends were determined.

Catalyst 1 was a Co/Mo on alumina hydrotreating catalyst available under the designation TK-574 from Haldor Topsoe, Inc., Houston, Tex. Catalysts 2-4 are also Co/Mo containing catalysts, but comprise different support materials. Catalysts 2-4 were synthesized using a solution prepared by dissolving 5.0 g of ammonium molybdate and 4.0 g of cobalt nitrate in 20 ml of water. The solution was then added dropwise to 25 g of the support material. The catalyst was dried overnight at 120° C., and subsequently calcined at 450° C. for 6 hours. The support used for catalyst 2 was 1/16 inch alumina spheres available form Mallinckrodt Specialty Chemicals Co. The support used for catalyst 3 was a ZSM-5 zeolite available from Sud-Chemie under the designation T4480. The support for catalyst 4 was also T4480 zeolite, however, this zeolite underwent a modification process before being contacted with the Co/Mo solution.

The support for catalyst 4 (i.e., the modified ZSM-5 zeolite) first underwent an acid leaching process, to remove alumina from the support, followed by steam treatment. During acid leaching, the ZSM-5 was contacted with hydrochloric acid at 90° C. for 2 hours with stirring. At the conclusion of the acid leaching process, the acid solution was decanted and the treated ZSM-5 was washed with distilled water followed by drying at 120° C. Once dry, the treated ZSM-5 was calcined at 540° C. Next, the acid leached ZSM-5 was contacted with steam at 650° C. for 5 hours, thus forming the modified ZSM-5 support.

A mixture comprising 20 wt. % soybean oil and 80 wt. % diesel was contacted with each of catalysts 1-4 under hydrotreating conditions (between about 370-395° C., at 500 psig, at a liquid hourly space velocity of 0.75 $hr^{-1}$). The cold flow properties of the resulting products were determined and are shown in Table 1.

TABLE 1

|  | Catalyst 1 | Catalyst 2 | Catalyst 3 | Catalyst 4 |
| --- | --- | --- | --- | --- |
| Catalyst active component | Co/Mo | Co/Mo | Co/Mo | Co/Mo |
| Catalyst support | $Al_2O_3$ | $Al_2O_3$ | ZSM-5 | Modified ZSM-5 |
| Run Temperature (° C.) | 385-395 | 370 | 370 | 370 |
| Product properties |  |  |  |  |
| Density (g/ml) | 0.821 | 0.819 | 0.857 | 0.828 |
| CFPP (° C.) | −2 | −3 | −44 | −26 |
| Cloud point (° F.) | 35 | 35 | −51 | −7 |
| Pour point (° F.) | 22 | 22 | <−76 | −16 |
| Liquid yield (v/v) | 0.98 | 1.03 | 0.64 | 0.90 |

Catalysts 1 and 2 gave high liquid yields, but their products exhibited poor cold flow properties. The product formed from catalyst 3 exhibited very good cold flow properties, but gave a poor liquid yield. Catalyst 4, comprising the modified ZSM-5 support, gave a much improved liquid yield and products have good cold flow properties.

The properties of the hydrotreated product of catalyst 4 were compared to that of 100% diesel (see, Table 2). Not only did the hydrotreated product exhibit superior cold flow properties, but it also had a higher cetane number.

TABLE 2

|  | 100% Diesel | Hydrotreated Product of 20% Soybean Oil/80% Diesel Using Catalyst 4 |
| --- | --- | --- |
| Cetane number | 51.9 | 53.9 |
| CFPP (° C.) | −14 | −26 |
| Cloud point (° F.) | 10 | −7 |
| Pour point (° F.) | −8 | −16 |
| Density (g/ml) | 0.826 | 0.828 |

EXAMPLE 2

In this example, a hydrotreating process was performed using four different catalyst arrangements, and the cold flow properties of the resulting products were compared. A mixture comprising 20 wt. % vegetable oil and 80 wt. % diesel was used as the reaction feed. The sulfur concentration of the feed was about 370 ppm. The hydrotreating process was conducted at 400° C., 500 psig, and a liquid hourly space velocity of 0.75 $hr^{-1}$.

The first catalyst arrangement comprised only a Co/Mo on alumina catalyst (catalyst 1 from Example 1). The second catalyst arrangement comprised only a Co/Mo on a modified ZSM-5 catalyst (catalyst 4 from Example 1). The third catalyst arrangement comprised a first layer containing catalyst 1 (Co/Mo on alumina) followed by a second layer of catalyst 4 (Co/Mo on modified ZSM-5). The fourth catalyst arrangement comprised a first layer of catalyst 4 followed by a layer of catalyst 1. In the third and fourth catalyst arrangements, the volume ratio of catalyst 1 to catalyst 4 was about 2.

The cold flow properties and sulfur content of the products of each hydrotreating reaction were determined. These properties are summarized in Table 3.

TABLE 3

| Catalyst arrangement | #1 (Co/Mo on alumina) | #2 (Co/Mo on ZSM-5) | #3 (Co/Mo on alumina followed by Co/Mo on ZSM-5) | #4 (Co/Mo on ZSM-5 followed by Co/Mo on alumina) |
| --- | --- | --- | --- | --- |
| Cloud point | 35° F. | −5° F. | 3° F.* | 1° F.** |
| Pour point (° F.) | 30° F. | −18° F. | −10° F.* | −8° F.** |
| Sulfur concentration | 10 ppm | 50 ppm | 10-15 ppm | 10-15 ppm |
| Liquid yield (v/v) | — | <95% | <95% | >95% |

*Initial values. The cloud and pour points increased to 29° F. and 16° F. at 300 hours of time on stream (TOS)
**Initial values. The cloud and pour points slowly increased to 12° F. and 4° F. at 300 hours TOS Thus, it was discovered that contacting the reaction feed with the Co/Mo on ZSM-5 followed by Co/Mo on alumina gave an increased liquid yield and lower cloud and pour points.

The embodiments of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A process for producing C10-C30 hydrocarbons comprising:
   (a) contacting
      i) a fluid comprising at least one fatty material and at least one feed hydrocarbon, and ii) hydrogen with a catalyst in a reaction vessel under conditions sufficient for converting at least a portion of said at least one fatty material into one or more C10-C30 hydrocarbons and propane;
   (b) separating at least a portion of said propane from said one or more C10-C30 hydrocarbons;
   (c) generating hydrogen from said separated portion of propane in step (b); and
   (d) recycling said generated hydrogen from step (c) to said reaction vessel of step (a),
   wherein said at least one fatty material is selected from the group consisting of triglycerides, dialycerides, monoalycerides, and free fatty acids,
   wherein said at least one feed hydrocarbon having a boiling point of between about 80° F. to about 1000° F., and
   wherein step (c) generates at least about 50% of the hydrogen required by step (a).

2. The process according to claim 1, wherein said hydrogen generation step comprises passing said separated portion of propane through a steam reformer.

3. The process according to claim 2, wherein said hydrogen generation step further comprises passing the product of said steam reformer though a water gas shift reactor.

4. The process according to claim 1, wherein said at least one feed hydrocarbon is present in said fluid at a level of between about 0.1 to about 99.9 weight %.

5. The process according to claim 1, further comprising supplying an amount of make-up hydrogen to the reactor in addition to said generated hydrogen.

6. The process according to claim 5, wherein said amount of make-up hydrogen supplied to the reactor based at least in part on the level of saturation of the at least one fatty material.

7. The process according to claim 1, wherein said catalyst comprises at least one member selected from the group consisting of Group VIB and Group VIII metals on a porous support.

8. The process according to claim 7, wherein said catalyst comprises cobalt and molybdenum.

9. The process according to claim 8, wherein said porous support comprises alumina and/or a zeolite.

10. The process according to claim 9, wherein said catalyst comprises cobalt and molybdenum on a zeolite support.

11. The process according to claim 1, wherein said at least one fatty material is selected from the group consisting of vegetable oils, yellow grease, animal fats and mixtures thereof.

12. The process according to claim 1, wherein said fluid comprises between about 0.1 to about 99.9 weight % of said at least one fatty material.

13. The process according to claim 1, wherein said separated portion of C1-C6 hydrocarbons comprises propane.

14. The process according to claim 1, further comprising removing at least one impurity from said generated hydrogen prior to feeding said generated hydrogen to the reactor.

15. The process according to claim 1, wherein said process generates at least about 10 moles of hydrogen for each mole of fatty material converted in step (a).

16. A process for producing C10-C30 hydrocarbons comprising:
    (a) contacting
       i) a fluid comprising at least one fatty material and at least one feed hydrocarbon, and ii) hydrogen with a hydrotreating catalyst in a reaction vessel under conditions sufficient for converting at least a portion of said at least one fatty material into one or more C10-C30 hydrocarbons and propane;
    (b) separating at least a portion of said propane from said C10-C30 hydrocarbons;
    (c) steam reforming said separated portion of propane thereby generating hydrogen; and
    (d) recycling said generated hydrogen from step (c) to said reaction vessel of step (a),
    wherein said at least one fatty material is selected from the group consisting of triglycerides, diglycerides, monoglycerides, and free fatty acids,
    wherein said at least one feed hydrocarbon having a boiling point of between about 80° F. to about 1000° F., and
    wherein step (c) generates at least about 50% of the hydrogen required by step (a).

17. The process according to claim 16, step (c) further comprising passing the product of said steam reforming through a water gas shift reactor thereby generating an additional amount of hydrogen.

18. The process according to claim 16, wherein said at least one feed hydrocarbon is present in said fluid at a level of between about 0.1 to about 99.9 weight %.

19. The process according to claim 16, further comprising supplying an amount of make-up hydrogen to the reactor in addition to said generated hydrogen.

20. The process according to claim 19, wherein said amount of make-up hydrogen supplied to the reactor based at least in part on the level of saturation of the at least one fatty material.

21. The process according to claim 16, wherein said catalyst comprises at least one member selected from the group consisting of Group VIB and Group VIII metals on a porous support.

22. The process according to claim 21, wherein said catalyst comprises cobalt and molybdenum.

23. The process according to claim 22, wherein said porous support comprises alumina and/or a zeolite.

24. The process according to claim 23, wherein said catalyst comprises cobalt and molybdenum on a zeolite support.

25. The process according to claim 16, wherein said at least one fatty material is selected from the group consisting of vegetable oils, yellow grease, animal fats, and mixtures thereof.

26. The process according to claim 16, wherein said fluid comprises between about 0.1 to about 99.9 weight % of said at least one fatty material.

27. The process according to claim 16, further comprising removing at least impurity from said generated hydrogen prior to feeding said generated hydrogen to the reactor.

28. The process according to claim 16, wherein said process generates at least about 10 moles of hydrogen for each mole of fatty material converted in step (a).

* * * * *